US012400534B2

(12) United States Patent
Baldwin et al.

(10) Patent No.: US 12,400,534 B2
(45) Date of Patent: Aug. 26, 2025

(54) FIRE PROTECTION FOR SMALL-SHOP DUST COLLECTION SYSTEMS

(71) Applicant: Oneida Air Systems, Inc., Syracuse, NY (US)

(72) Inventors: Joseph Baldwin, Syracuse, NY (US); Jeffrey M. Hill, Cicero, NY (US); Robert M. Witter, Englewood, FL (US)

(73) Assignee: Oneida Air Systems, Inc., Syracuse, NY (US)

( * ) Notice: Subject to any disclaimer, the term of this patent is extended or adjusted under 35 U.S.C. 154(b) by 0 days.

(21) Appl. No.: 18/235,398

(22) Filed: Aug. 18, 2023

(65) Prior Publication Data

US 2025/0006030 A1 Jan. 2, 2025

Related U.S. Application Data

(60) Provisional application No. 63/399,398, filed on Aug. 19, 2022.

(51) Int. Cl.

| | |
|---|---|
| ***G08B 17/06*** | (2006.01) |
| ***G08B 7/06*** | (2006.01) |
| ***G08B 17/10*** | (2006.01) |
| ***G08B 17/113*** | (2006.01) |
| ***G08B 17/117*** | (2006.01) |

(52) U.S. Cl.
CPC ............... *G08B 17/06* (2013.01); *G08B 7/06* (2013.01); *G08B 17/10* (2013.01); *G08B 17/113* (2013.01); *G08B 17/117* (2013.01)

(58) Field of Classification Search
CPC ...... G08B 17/10; G08B 17/113; G08B 17/06; G08B 17/00; G08B 17/117
See application file for complete search history.

(56) References Cited

U.S. PATENT DOCUMENTS

| | | | | |
|---|---|---|---|---|
| 4,177,461 | A * | 12/1979 | Brown ...................... | A23B 5/02 34/174 |
| 6,626,984 | B1 * | 9/2003 | Taylor ..................... | B01D 50/20 96/380 |
| 7,129,847 | B2 * | 10/2006 | Right ...................... | G08B 17/10 340/606 |
| 8,117,764 | B2 * | 2/2012 | Ness .......................... | C10L 9/08 34/497 |
| 8,496,719 | B2 * | 7/2013 | Witter ................ | B01D 46/0093 55/DIG. 20 |
| 9,395,345 | B2 * | 7/2016 | Singh ................... | G08B 17/113 |
| 9,630,037 | B2 * | 4/2017 | Berghuijs ............... | B01D 50/20 |

* cited by examiner

*Primary Examiner* — John A Tweel, Jr.
(74) *Attorney, Agent, or Firm* — Bernhard P. Molldrem, Jr.

(57) ABSTRACT

Early alert and automatic shutdown system for dust producing and/or dust collecting tools senses for smoke or an overheat or spark condition in the dust-collection barrel and/or dust conveying conduit. When an upset condition is detected, fire, smoke or spark, the system signals the operator e.g. with a flasher or an audible alarm, or mechanical indicator. The system can also shut down the dust producing tool and/or the dust collector. The unit is based on a plug-and-play control box coupled with smoke and heat/spark sensors and with the system power.

6 Claims, 12 Drawing Sheets

FIRE PROTECTION FOR SMALL-SHOP DUST COLLECTION SYSTEMS

This patent application claims priority under 35 U.S.C. § 119(e) of our provisional patent application Ser. No. 63/399,398, Aug. 19, 2022, the disclosure of which is incorporated by reference herein.

This invention concerns dust collection systems and dust-producing tools, which may be employed in a small, single-person wood shop or other shop or facility that produces dust or similar airborne debris which is separated from the airflow and which may be flammable.

Increasingly, dust collection systems are being used in small, single-person operations where there is a CNC router or similar power tool running on its own, i.e., a lights-out situation. The blank workpieces may be fed to the machine automatically, and the finished workpieces removed and stored. These machines may run for a long period of time unattended, where the operator may be elsewhere. There are many fire-protection systems for industrial-scale dust collection systems, but to date no small-scale, inexpensive systems for small operations. Accordingly, there has been a need for a small-scale system that can alert the user on the occasion of a smoke or overheat condition, e.g., of the dust collection barrel, and/or for the presence of smoke, and then presents an audible alarm (and/or flashing lights or a secondary alarm) and then also sends a shut-down signal or voltage to the motor for the dust collection system, and which may also trigger a shut-down of the dust-producing tool.

A control box is designed to be plug-and-play; it can be hard-wired, wireless, or may utilize pinned connectors that connect via cables or jumpers to sensors, such as a smoke-alarm box, a heat sensor, i.e., a thermal switch, or a spark detector. In a practical example, there are two three-pin connectors that connect to respective smoke-alarm boxes, a male two-pin connector on the top that is intended to tie into a magnetic starter on the dust separator, and a female two-pin connector intended to tie into a thermal switch. If the user so chooses, the thermal switch can be omitted, and the system will continue to function using smoke detection units alone.

A thermal switch or spark detector can be in thermal contact with the dust collection drum or with the dust collection conduit. The thermal switch is favorably captured by an enclosure, and the enclosure can be attached by adhesive tape to one side of the drum or secured to the drum by screw fasteners or by clamps. The control box can be connected to a thermal switch or spark detector and can be configured to tie multiple switches together in parallel. The switch(es) are units that have low voltage running through them, and the smoke detector(s) have a low-voltage signal wire. The control box provides the low-voltage signal needed for the optional thermal sensors and/or spark detectors; the smoke alarms have a built-in low-voltage power supply, or can be fed 9-volts from the control box, to trigger an alarm.

A commercially available relay/power supply module is housed inside the main control box, and has seven wires with color-coded insulation. In one practical example, the color coding can be as follows: Black=AC Hot; White=AC Neutral; Red=Interconnect signal; Blue=common contact; Orange=normally-open contact (NO); Yellow=normally-closed contact (NC); and Gray=9-volt DC output. The DC output can be used to power the optional thermal sensors and/or spark detectors.

OBJECTS AND SUMMARY OF THE INVENTION

According to the principles of this invention, a fire alert and shutdown arrangement can be provided and adapted for any dust collection system and/or dust-producing tool. A control box contains electrical mechanisms and circuitry, with at least one smoke alarm and detector being coupled to the control box. The smoke alarm/detector is active to provide an alert if smoke or heat is present. A circuit arrangement within the control box provides AC power and also provides a low-voltage (e.g., 9 volts DC) to the applicable optional heat sensors and/or spark detectors. A relay receives the DC power and a cable is connected between the control box and the dust collector and/or dust producing tool for signaling the units to turn off the dust collector and/or dust-producing tool when smoke or overheat is detected.

More particularly, the fire alert and shutdown system can comprise or consist of one or more commercially available smoke alarms tied into a common signal relay, and optionally also to one or more heat detectors or spark detectors wired in parallel with one another and connected to the same signal relay. When smoke or overheat is detected, the common signal relay triggers a "fault' state. The control box then has one or more outputs that can activate one or more relays. The control box can disrupt power to the magnetic starter of the dust collection tool and/or dust producing tool. The same can activate a visual alarm in addition to an optional sonic alarm that is independent from the built-in sonic alarm on the smoke detector(s). The control box can remotely alert a user via a hard-wired, mechanical, or wireless signal. A latching relay can be added to ensure the system stays in a fault state until the user resets it, ensuring that the user will always be made aware that a fault occurred even if they were not in the vicinity when it occurred. The alert system can be used with existing interlocked systems, such as IVAC.

The fire protection arrangement can also have a thermal switch or spark detector mounted on one or both of the dust conduit and the dust collection drum, with a signal conduit connecting the thermal switch or spark detectors and the control box.

The fire protection arrangement can allow for at least one smoke detector (typically, two) and an optional heat detector or spark detector, with the option of adding on as many smoke detectors and/or heat/spark detectors, as the user wants or needs for the specific situation.

It is envisioned that commercially available smoke detectors would be used, and that this fire protection arrangement would provide notification of a "fault" condition via any of a cellular signal, WiFi, hard-wire, ethernet bluetooth, or other available channel. This arrangement was designed with small systems, e.g., one-man operations, in mind, but can be expanded to mid-size or larger operations.

BRIEF DESCRIPTION OF THE DRAWING

FIG. 4 is an enlargement showing the magnetic starter tie-in.

DETAILED DESCRIPTION OF A PREFERRED EMBODIMENT

Figure 1:
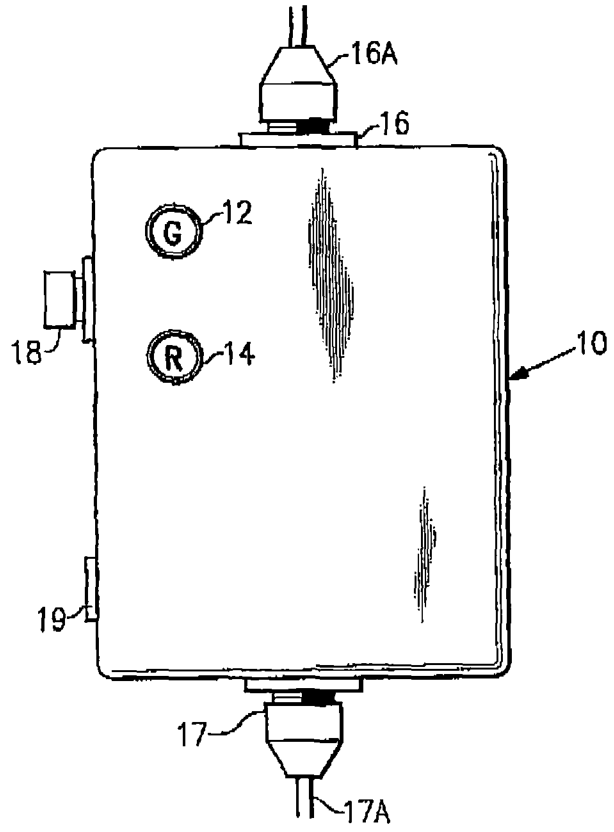
FIG. 1 and FIG. 2 are a front view and side view, respectively, of the system's control box with indicator lights, push switches and connectors.
Figure 2:
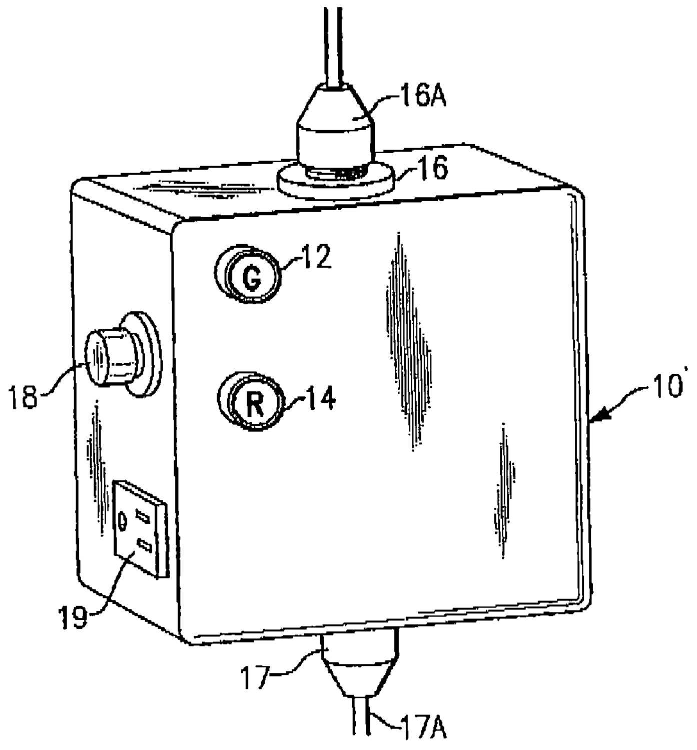

With reference to the accompanying Drawing Figures, and initially to FIGS. 1 and 2, a representative embodiment of a fire- and smoke-protection system for small woodshop environment or similar operation, shows a control box 10 which connects e.g. with sensors (to detect smoke or over-heat or spark) and can connect also with a magnetic starter for the dust collection motor and/or dust producing power tool. The control box 10 has a green power indicator light 12 and red fault indicator light 14 mounted on the front cover, with the light 12 ON when the device has power, and the red fault light 14 turning ON when there is an upset condition (smoke or overheat/spark detected). The control box also has a three-pin connector 16 on the upper side (to connect to a connection cable 16A), and a two-pin connector 17 on the lower side (to connect with a connector cable 17A), and also has a push-button reset switch 18 and an additional connector receptacle 19 on one side wall.

Figure 3:
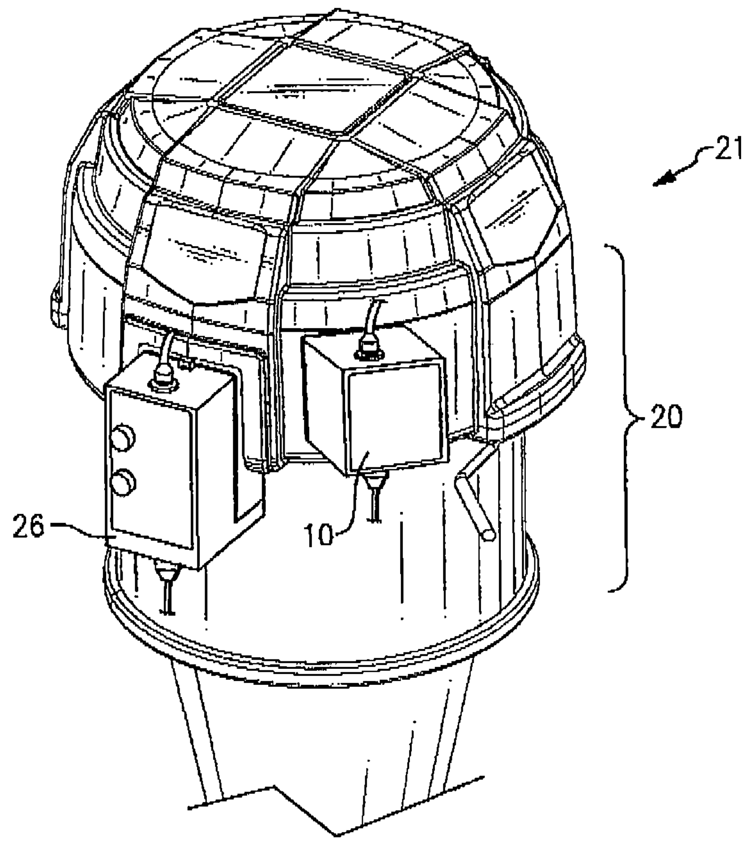
FIG. 3 shows system boxes mounted onto the side of a dust cyclone near or at the head where the fan motor is housed.
Figure 4:
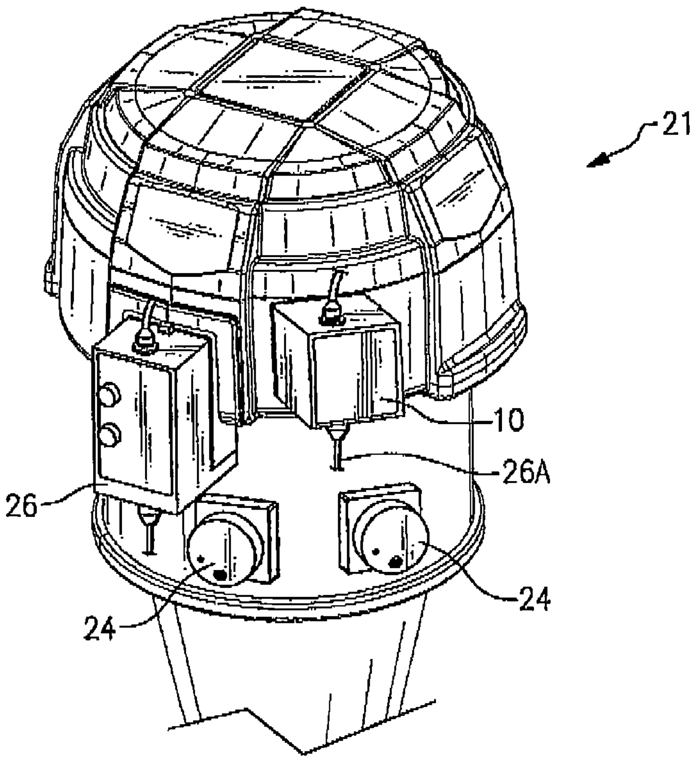

FIGS. 3 and 4 show a representative example of the control box 10 mounted on a dust cyclone dust collector 20, preferably on or near the head cover 21 where the fan motor is housed. The magnetic motor start unit 26 for the cyclone 20 is located nearby, and may also be connected to a connector of the control box 10. One or more smoke detectors 24 may be positioned on the outer surface of the cyclone, as shown in FIG. 4 and may be interconnected with the control box 10. Each smoke detector 24 is mounted onto a mounting box, to be discussed later, and which provides 9-volt DC power and signaling, as needed.

Figure 5:
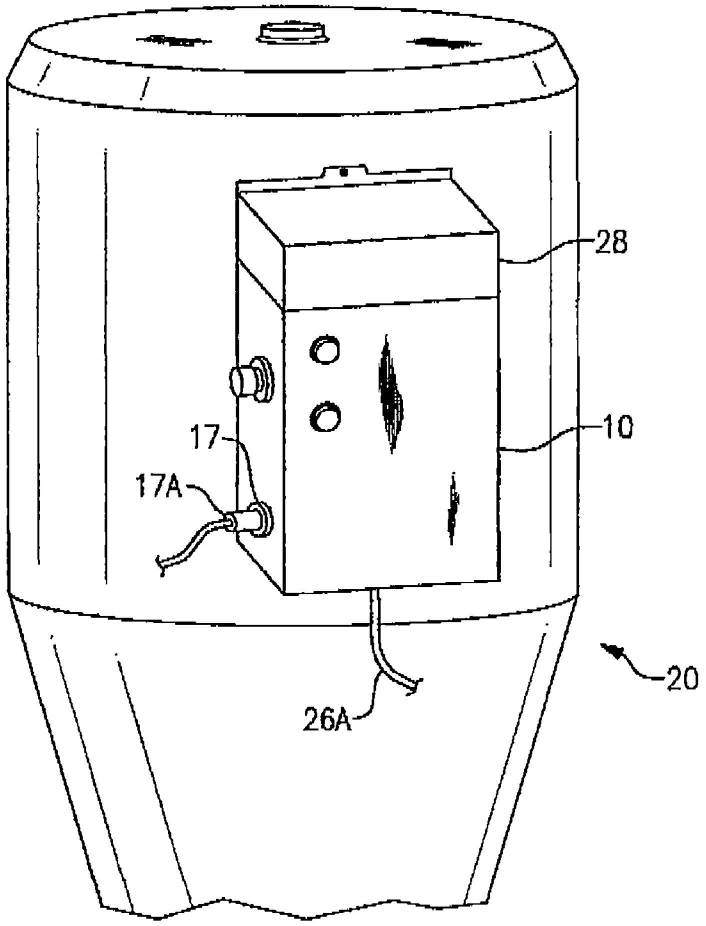
FIG. 5 illustrates the thermal switch tie-in, with wires also for connecting with DC voltage.
Figure 6:
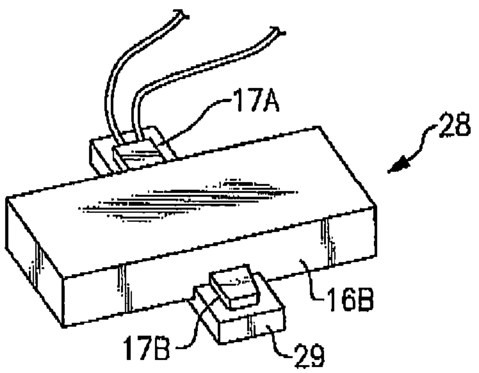
FIG. 6 is an enlargement of the thermal switch taped onto the dust collection drum.
Figure 7:
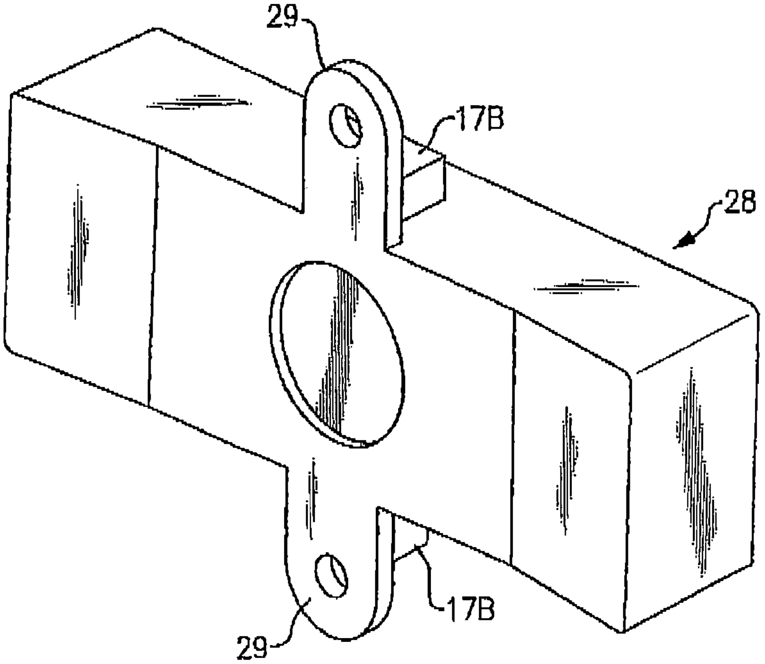
FIG. 7 shows a front view of the thermal switch.

FIG. 5 shows the control box 10 adjacent to a thermal detector 28, both mounted on the cyclone or on the dust collection bin. This heat detector is coupled be a two-wire cable 17A and a two-pin connector to the receptacle 17 on the control box. The wires of the cable carry the signal voltage from the thermal sensor 28 and also provide the DC voltage to the sensor. FIG. 6 shows the thermal switch tie-in, including the cable 17A with the sensor being present within a molded housing. FIG. 7 shows an enlargement of the thermal switch 28 and its housing with connectors 17B for one or more of the cables 17A. This housing permits the sensor to be taped onto the cyclone or the dust collection drum, or alternatively to be attached with screws.

FIGS. 6 and 7 illustrate the heat sensor 28 and in particular show the housing for the device, which can be taped or adhered onto the dust collection bin or to the conduit from the dust producing tool to the intake of the dust cyclone. There are also upper and lower apertured tabs 29 that permit the heat sensor to be attached by screw fasteners, as appropriate, to the dust collection drum or the dust conduit. The connectors 17B can be on one or both of the upper and lower surfaces of the housing.

Figure 8:
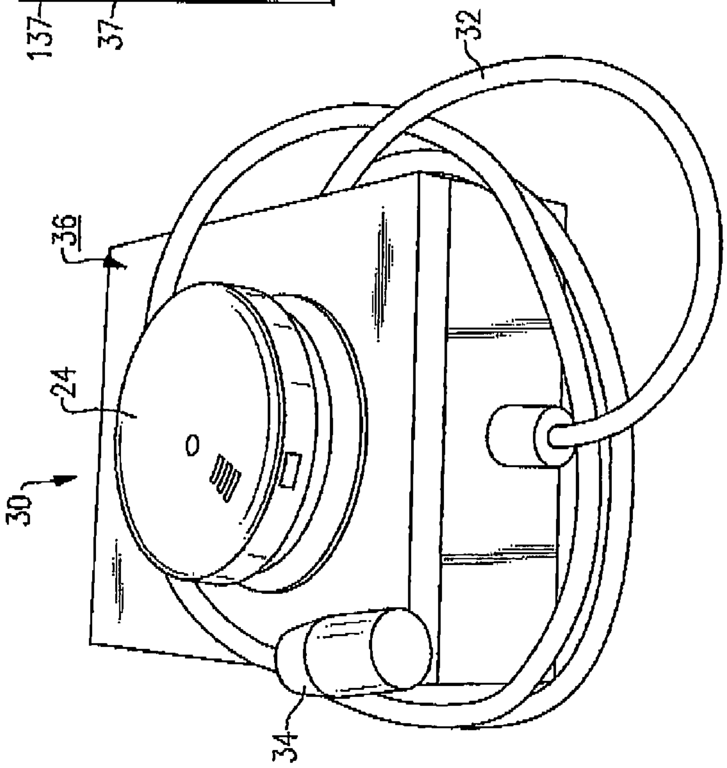
FIG. 8 shows a smoke alarm tie-in with a pre-wired cable whip.

FIG. 8 shows the smoke alarm tie-in 30, here in the form of a mounting circuit box 36. with a pre-wired cable whip 32, The cable whip has a male connector 34 at its remote end that fits into the smoke-alarm fitting or receptacle 16 as previously described. This can provide 9-volt DC power for the sounder in the smoke alarm 24, although a commercial smoke alarm may have an internal battery power source.

Figure 9:
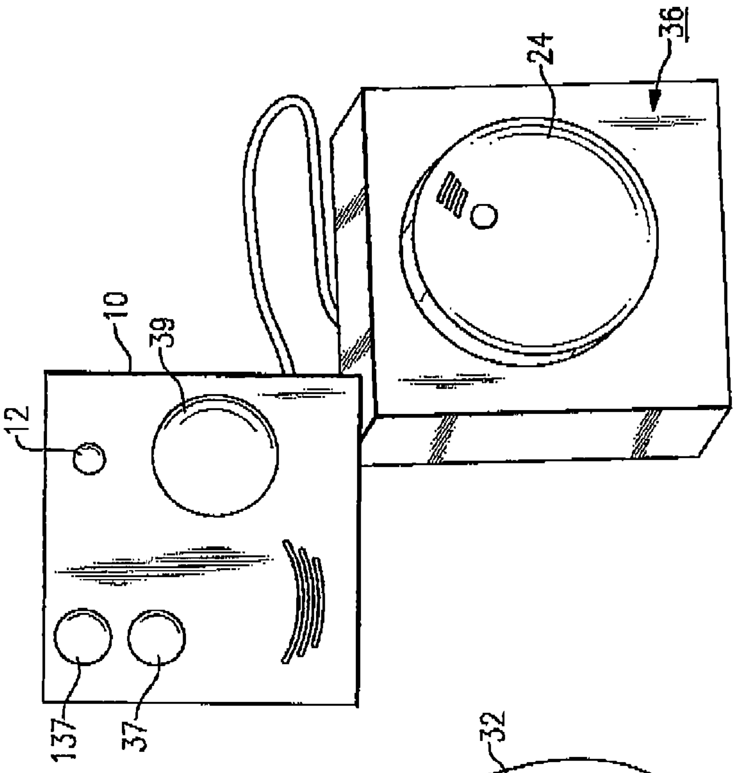
FIGS. 9 and 10 show an alternative control box with optional indicator light, sonic alarm and other features.
Figure 10:
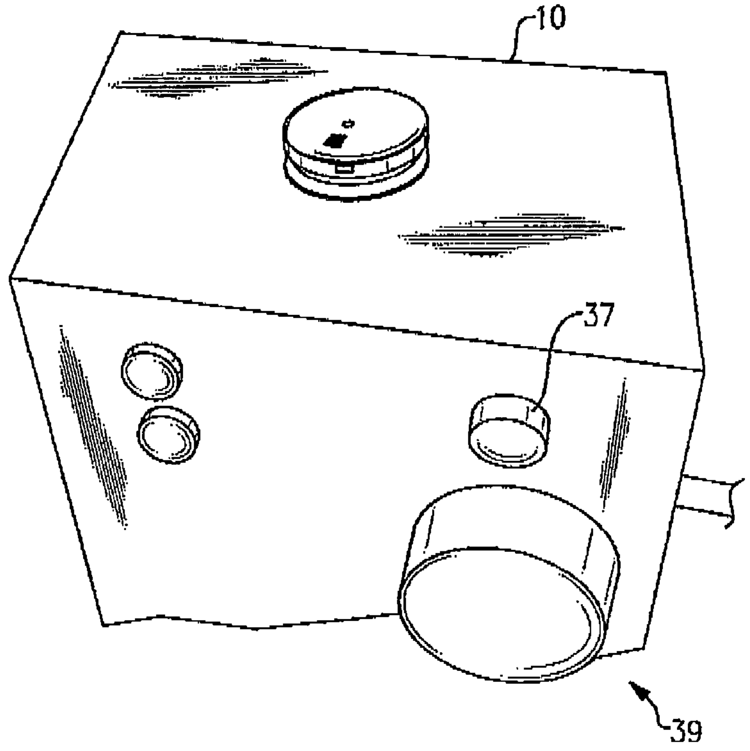
Figure 11:
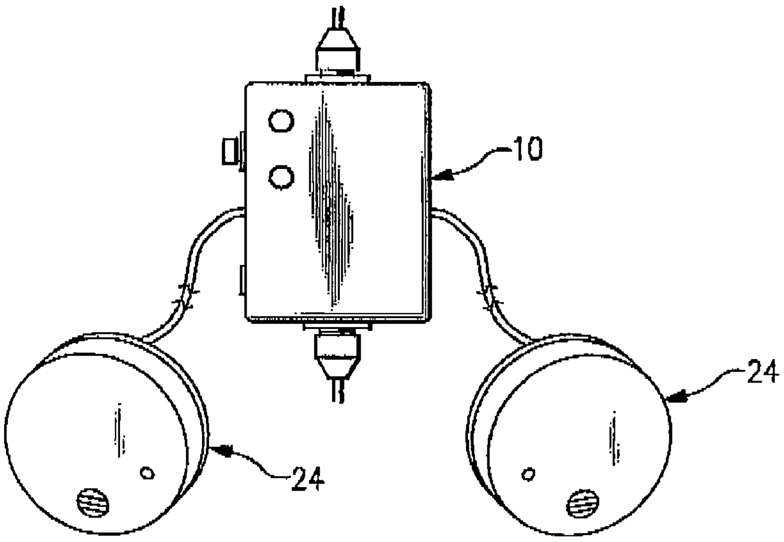
FIG. 11 shows an embodiment of the alarm box with fewer features for a smaller woodshop operation.

FIGS. 9, 10 and 11 show an arrangement in which the smoke detector/alarm box 36 is mounted on one side of the dust collector drum 29, and with the associated cable whip 32 going from the tie-in 30 to the control box 10. Here the control box is shown with a reset button 37 to permit the operator to reset the system circuitry after an incident where overheat or smoke has been detected and dealt with. A test button 137 is also shown here. The control box also has a visual flasher alert 39 in addition to the power-on light 12. FIG. 11 illustrates a simpler version of an alarm and upset detection system for a smaller woodshop operation, in which the control box 10, e.g., mounted on the dust collector hood, is coupled to a pair of smoke alarms 24 which can be separated by an appreciable amount, but a heat sensor is not employed.

Figure 12:
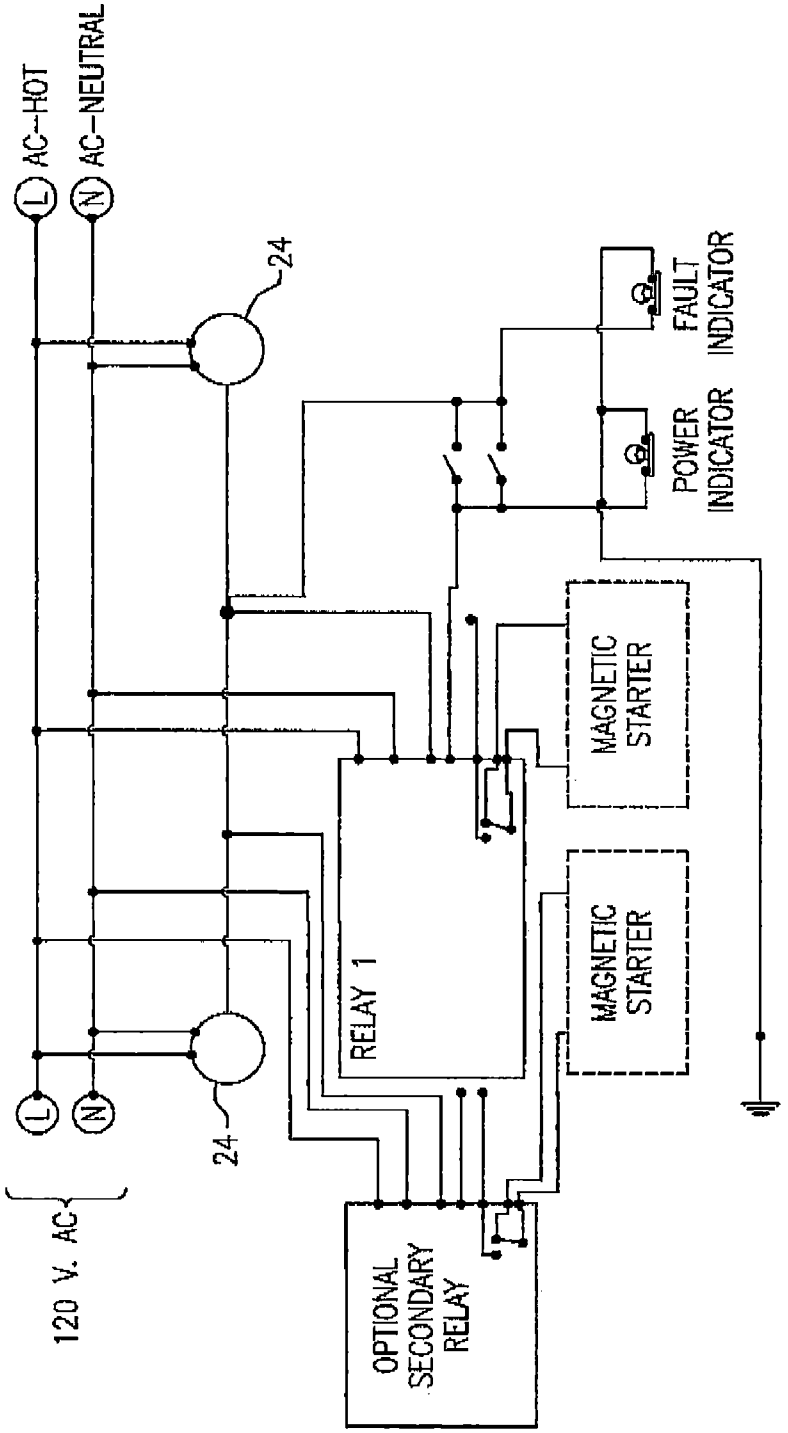
FIG. 12 is a wiring diagram for the control box.
Figure 13:
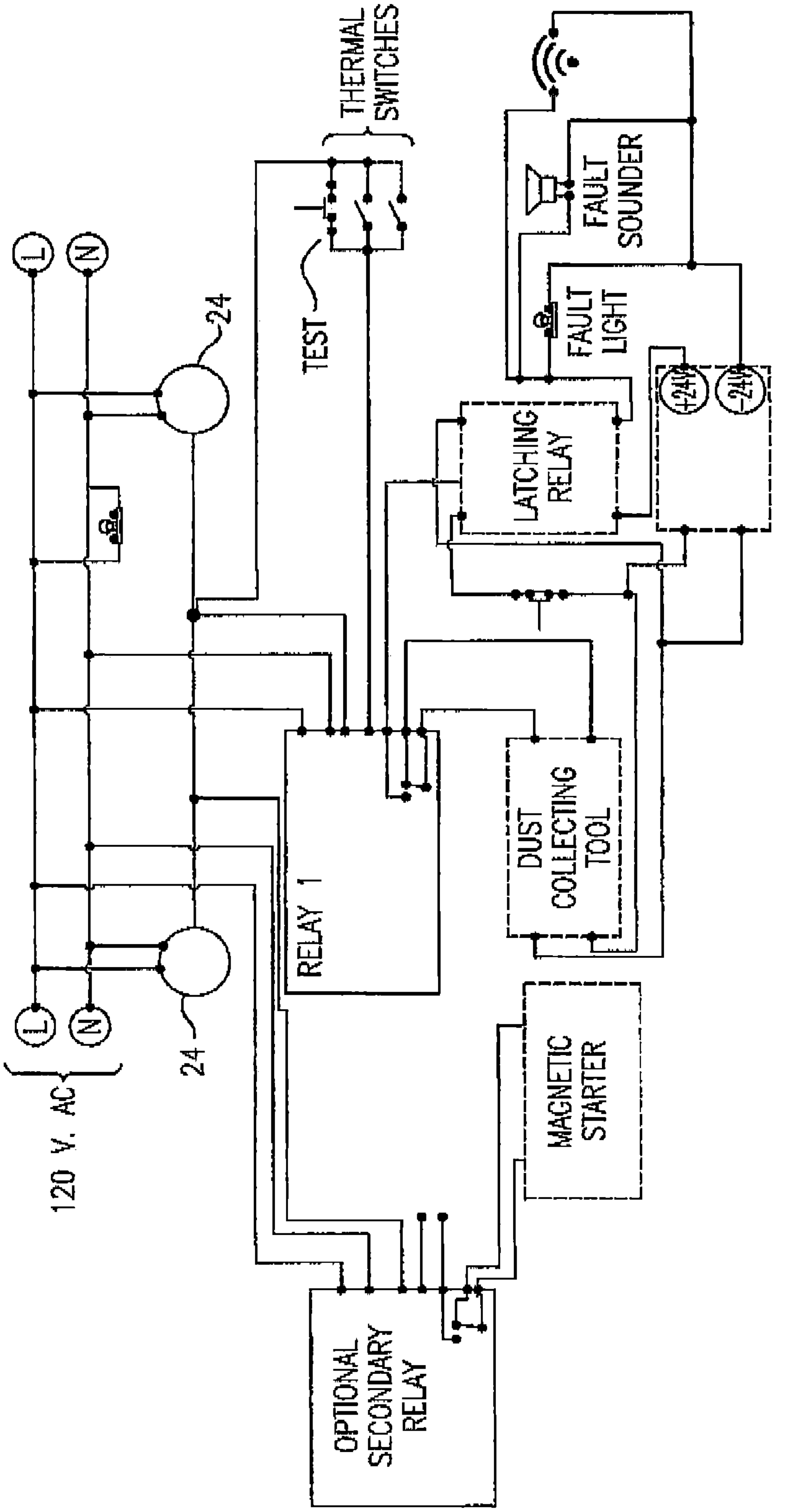
FIG. 13 shows an advanced version of the control box with some of the optional add-on features that are possible.

FIGS. 12 and 13 are circuit diagrams for the circuitry within the control box, with FIG. 12 being a wiring diagram for a simple version of the alert system, and FIG. 13 being a wiring diagram for an alert system with additional optional features. FIG. 13 features a latching alarm relay that can remain in a fault mode until reset by the operator, and may include a wireless alarm system for notifying a user of a detected smoke or over-temperature event by means of wi-fi blue tooth or similar; and a relay switch for automatically powering down the dust-producing tool and/or dust collector. The relay shown in FIGS. 12 and 13 receives 120 volt AC power from the power main, and provides the 9-volt DC (gray wire) as well as switched outputs COMM (blue wire), NC (yellow wire), NO (Orange wire), and signal (red wire) as signaling to the smoke alarms and fault lights, and optionally to a remote alert system (FIG. 13)

Figure 14:
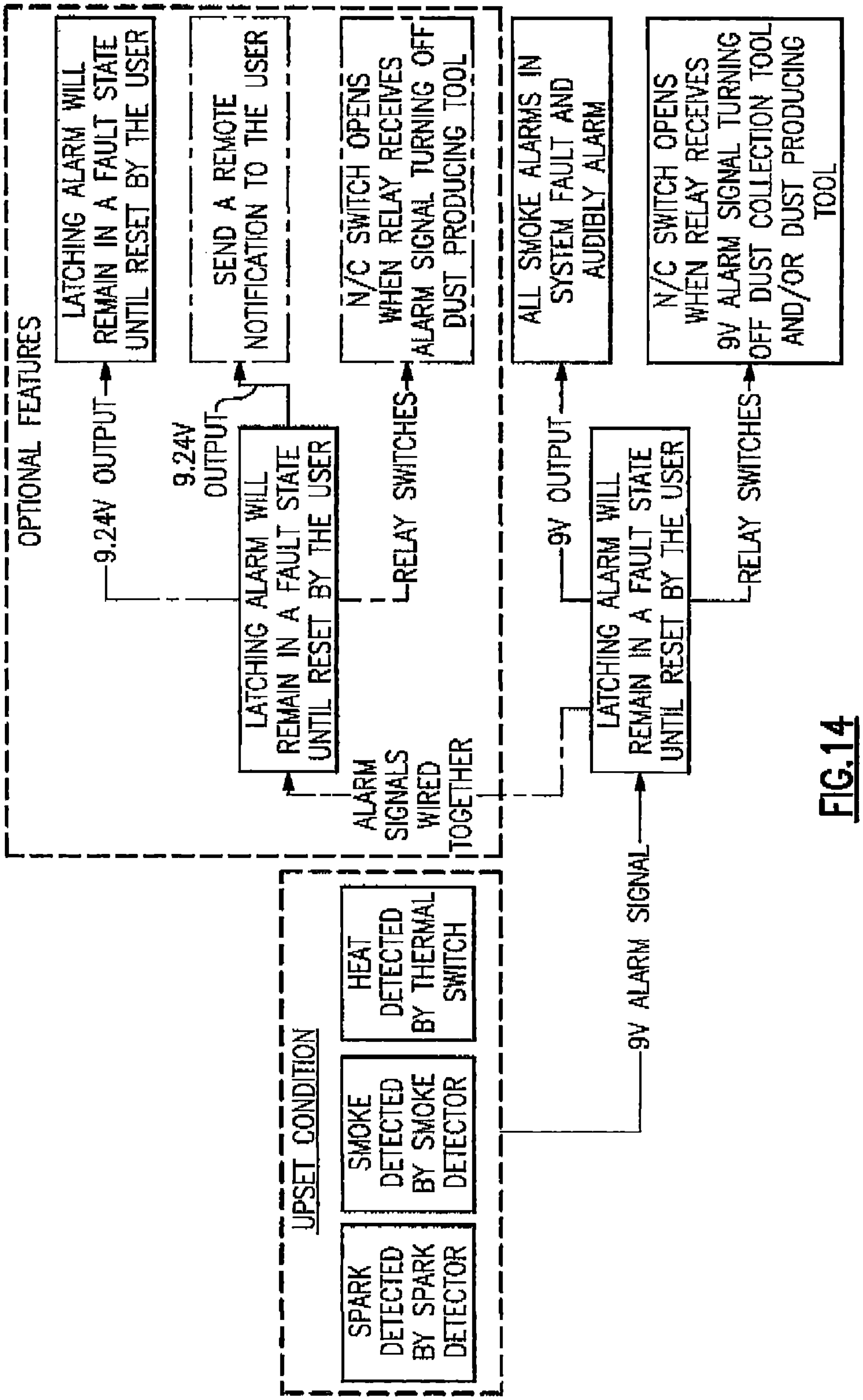
FIG. 14 Is a logic diagram showing how the system will react under a fault scenario.

FIG. 14 is a logic diagram explaining the operation of the system. If an upset condition (smoke or over-heat) is detected, the system sends a 9-volt signal to a main relay, which closes the normally-open (NO) contact to trigger all the smoke alarms and set off an audible alarm (and optionally visible flasher), and also opens its normally-closed (NC) contact to power down the dust collector and dust-producing tool. The relay can also signal a secondary latching relay to set off the alarm lights and sounders, and send a notification to the operator. The latching relay is configured to receive a reset signal from the operator, but will remain latched in the fault state until reset by the operator.

The invention has been described in terms of selected preferred embodiments, but it should be understood that the invention is not limited only to those embodiments; rather the scope of this invention is to be measured by the appended claims.

What is claimed is:

1. Fire protection, detection and alarm system in a woodshop or workshop in which a dust producing tool produces dust which may be flammable or combustible and which is produced by a dust producing tool and is conveyed via a conduit to a dust separator which separates out said dust and deposits it into a dust collection bin;

the fire protection system comprising at least one of a thermal switch mounted on one or both of said dust collection bin and said dust conduit; and a smoke detector mounted at or hear said dust producing tool or said dust collection bin;

a control box;

one or both of a visible alarm flasher and an audible alarm sounder;

said control box having circuitry including a connector receptacle for connecting with said at least one thermal switch and with said at least one smoke detector; and a relay arrangement that includes conductors for connecting with AC electrical power; a DC output providing direct current at a predetermined DC voltage; an input terminal for receiving a signal from one or both of said at least one smoke detector and said thermal switch; a normally open (NO) contact coupled to energize said visible alarm flasher and said audible alarm; a normally closed (NC) contact connected to a start mechanism for one or both of said dust collection bin and said dust producing tool to shut said dust producing tool OFF when an overheat or smoke condition is detected.

2. The fire protection, detection and alarm system of claim 1 wherein said control box has a front panel on which are mounted a first visible indicator to show power is present and being applied to the fire protection and alarm system, and a second visible indicator to show that a fault condition of flame and/or smoke has been detected.

3. The fire protection, detection and alarm system of claim 1, wherein said thermal switch is contained in a housing that is fastened onto one or both of said dust collection bin and said dust conduit.

4. The fire protection, detection and alarm system of claim 1 including conduit having a two-pin connector and leading to a magnetic starter on said dust collection bin.

5. The fire protection, detection and alarm system of claim 1 comprising a conduit leading to said thermal switch, and having a two-pin connector.

6. The fire protection, detection and alarm system of claim 1, wherein the circuitry of the control box provides said DC voltage to said smoke detector at a level suitable for said smoke detector.

* * * * *